(12) United States Patent
Koren et al.

(10) Patent No.: US 8,074,807 B2
(45) Date of Patent: Dec. 13, 2011

(54) SCREENING SYSTEM FOR OBJECTS IN TRANSIT

(75) Inventors: Gary Koren, Arsuf (IL); Shalom Dolev, Ramat Gan (IL)

(73) Assignee: SecureLogic Ltd. of the Logistica Systems Group, Netanya (IL)

( * ) Notice: Subject to any disclaimer, the term of this patent is extended or adjusted under 35 U.S.C. 154(b) by 307 days.

(21) Appl. No.: 11/819,704

(22) Filed: Jun. 28, 2007

(65) Prior Publication Data

US 2008/0156704 A1    Jul. 3, 2008

Related U.S. Application Data

(62) Division of application No. 10/516,010, filed as application No. PCT/IL03/00488 on Jun. 10, 2003, now Pat. No. 7,503,457.

(30) Foreign Application Priority Data

Jun. 16, 2002    (IL) .......................................... 150251

(51) Int. Cl.
*G06F 7/00*    (2006.01)
(52) U.S. Cl. ...................................... 209/559; 700/222
(58) Field of Classification Search .................. 209/552, 209/559, 583; 700/222, 223, 224, 225
See application file for complete search history.

(56) References Cited

U.S. PATENT DOCUMENTS
4,020,346 A    4/1977    Denis
(Continued)

FOREIGN PATENT DOCUMENTS
CA    2224849    6/1998
(Continued)

OTHER PUBLICATIONS

International Search Report, International Application No. PCT/IL03/00488. Date of Mailing Apr. 21, 2004.

*Primary Examiner* — Jeremy R Severson
(74) *Attorney, Agent, or Firm* — Pearl Cohen Zedek Latzer, LLP

(57) ABSTRACT

The present invention relates to the screening of objects in-transit and materials, for security purposes (i.e. explosives detection).
The invention provides an adjustable computerized system suitable for use at airports, seaports, land terminals, distribution centers, railway terminals, border crossings or other transit terminals, in order to achieve maximal efficiency and detection reliability, by adjustment of the screening process of any specific object to its risk factor in conjunction with the characteristics of the available in-line detection equipment.
The invention provides an automated security inspection and conveying system for in-transit objects, comprising means for identifying the sender of each package and to profile and import the security status data relevant to the object into the system, and a plurality of various security screening machines in combination with conveying and sorting components. The system tracks each package from a reception point through the conveyors and screening machines to reach a sorting junction, via a user-adjustable screening process, the conveying and sorting components being interfaced with the security status data for assigning a risk assessment factor to the object and the sender. Each package is routed via an appropriate number of screening devices, the output of the screening devices being processed and the risk assessment factor being adjusted accordingly, the new risk assessment factor being sent to a control system of the conveying and sorting components.

5 Claims, 3 Drawing Sheets

U.S. PATENT DOCUMENTS

| | | |
|---|---|---|
| 5,022,062 A | 6/1991 | Annis |
| 5,079,714 A | 1/1992 | Manduley et al. |
| 5,793,639 A | 8/1998 | Yamazaki |
| 5,842,555 A | 12/1998 | Gannon |
| 6,003,010 A | 12/1999 | Scolly et al. |
| 6,044,353 A | 3/2000 | Pugliese, III |
| 6,088,423 A | 7/2000 | Krug et al. |
| 6,584,170 B2 | 6/2003 | Aust et al. |
| 6,707,879 B2 | 3/2004 | McClelland et al. |
| 6,922,460 B2 | 7/2005 | Skatter et al. |
| 7,023,956 B2 | 4/2006 | Heaton et al. |
| 7,503,457 B2 * | 3/2009 | Koren et al. ............ 209/559 |
| 2003/0167240 A1 | 9/2003 | Napier et al. |
| 2003/0225612 A1 | 12/2003 | DeSimone et al. |
| 2004/0246097 A1 | 12/2004 | Queenan |

FOREIGN PATENT DOCUMENTS

| | | |
|---|---|---|
| CA | 2314495 | 1/2001 |
| JP | 8053221 | 2/1996 |

* cited by examiner

SCREENING SYSTEM FOR OBJECTS IN TRANSIT

CROSS-REFERENCE TO RELATED APPLICATIONS

This application is a Divisional Application of U.S. application Ser. No. 10/516,010, filed Nov. 29, 2004 now U.S. Pat. No. 7,503,457, which is a National Phase Application of PCT International Application No. PCT/IL2003/000488, International Filing Date Jun. 10, 2003, claiming priority of Israel Patent Application 150251, filed Jun. 16, 2002

FIELD AND BACKGROUND OF THE INVENTION

The present invention relates to the screening of objects in-transit and materials, for security purposes (i.e. explosives detection).

More particularly, the invention provides an adjustable computerized system suitable for use at airports, seaports, land terminals, distribution centers, railway terminals, border crossings or other transit terminals, in order to achieve maximal efficiency and detection reliability, by adjustment of the screening process of any specific object to its risk factor in conjunction with the characteristics of the available in-line detection equipment.

The words object, cargo, items, materials, luggage, and baggage as used in the present specification refer to any object being transported by land, sea or air, whether or not there is an accompanying passenger. Such object can be a pallet, an air pallet, a container, a sea container, a truck-load, a storage tank, bulk materials, luggage, baggage, a bag, a suitcase, a rucksack, a parcel, an envelope and the like, any of which are to be transported by bus, lorry, train, ship or aircraft.

The words passenger, shipper, sender and/or the like as used in the present specification refer to any type of an individual/entity involved in the transit process, whether passenger, shipper, sender, intermediate warehouse, fulfillment center, distribution center, manufacturer, freight forwarder, shipping agency, etc.

It is an unfortunate fact of life in present-day transportation that objects need to be screened for security purposes, typically for the prevention of hijackings and destruction of means of transportation (aircraft, ship, train, bus etc.) by explosives, as well as eliminating explosives smuggling. The events of Sep. 11, 2001 clearly indicate that terror organizations will exploit any visible security gap, and there is an urgent need to close any such gap, The transportation area is widely recognized as a high priority target and huge resources are allocated for terror prevention. Screening is also helpful in reassuring peaceful passengers, that it is safe to travel.

Various known machines are able to detect metal objects, or to identify weapons, or to detect explosives materials and even minute traces thereof. Some devices are based on X-ray inspection, for example the apparatus disclosed by Dennis in U.S. Pat. No. 4,020,346. The known technologies enable thorough check of the belongings of each and every passenger before take-off.

However, highly sensitive screening is typically slow, thus conveying every suitcase through a high detection rate machine consumes much time, requires multiplication of very expensive and slow machinery, creates large inconvenience for passengers and shippers, and require huge manpower and precious space resources.

A system of this type is disclosed by Yamazaki in U.S. Pat. No. 5,793,639. An airport baggage receiving and handling method receives a passenger's baggage and identifies and processes the baggage and relates the baggage to the owner thereof.

The disadvantage of prior art systems is in that all passengers are treated equally. Indiscriminate application of security measures lead to absurd results, such as the confiscation at an airport of a nail file from a 68-year-old grandmother, and the frisking of people at a bank branch who have been customers at this bank branch for 40 years. Prior art systems are based on the premise that as the percentage of terrorist attempts to destroy a passenger plane is so low relative to normal business, only small percentage is sufficient to ensure detection of the extremely small number of terrorists and their explosives. The recent Aviation Security Bill (USA), released on Nov. 19, 2001, specify a mandatory 100% screening of all checked baggage.

The British Airport Authority has developed a multi-phase configuration of 100% baggage screening), which is in operation in more than 20 airports but has a number of major disadvantages. The system includes a sequence of automated explosives detection machines and manual alarm-resolution workstations. It is widely recognized that the probability of detection achieved by this configuration is a very low due to the combined effect of high-speed/low-sensitivity machines at the income point and the "dilution effect" caused by faulty manual alarm resolution when thousands of baggage units are to be inspected by an over-fatigue operator during an 8 hour working shift.

No solution has been found to the inherent conflict between a high security level and high throughput.

The cost of a 100% screening system in a "stand-Alone" method is high in labor, space and equipment, and passengers are inconvenienced by being shifted from the regular check-in process. A further disadvantage of this prior art baggage screening method is that the system is visible to the public, a fact that is raising political claims of discrimination and at the same time helps the terrorists intelligence.

OBJECTS OF THE INVENTION

It is therefore one of the objects of the present invention to obviate the disadvantages of prior art security systems and to provide a system which can be adjusted so that low-risk objects are processed speedily while achieving a high detection rate by subjecting the high-risk objects to rigorous inspection.

It is a further object of the present invention to achieve a high throughput with minimal labor costs.

Yet a further object of the invention is to allow adjustment of the degree of inspection in response to information received from outside the system regarding anticipated threats and anticipated loading requirements.

Yet a further object is to provide a system the functioning of which is opaque to an outside observer.

SUMMARY OF THE INVENTION

The present invention achieves the above objects by providing an automated security inspection and conveying system for in-transit objects, comprising means for identifying the sender of each package and to profile and import the security status data relevant to the object into the system, and a plurality of various security screening machines in combination with conveying and sorting components. The system tracks each package from a reception point through the conveyors and screening machines to reach a sorting junction, via a user-adjustable screening process, the conveying and sorting components being interfaced with the security status data for assigning a risk assessment factor to the object and the sender. Each package is routed via an appropriate number of screening devices, the output of the screening devices being processed and the risk assessment factor being adjusted accordingly, the new risk assessment factor being sent to a control system of the conveying and sorting components. Thereby an object is accordingly diverted to a track leading to a "reject" bay, or to a track for further screening of an "alarmed" object, or to the final loading track assuming the object was cleared for transportation.

In a preferred embodiment of the present invention there is provided an inspection and conveying system, wherein each package is provided with a machine-readable identification tag, and the system identifies packages by means of tag readers positioned adjacent to the conveying and sorting components.

In a most preferred embodiment of the present invention there is provided a object inspection and conveying system further includes alarm resolution means for a remote human operator workstation for further threat assessments that effect the routing of the object, all performed with no interference to the object's forward motion.

It will thus be realized that the novel system of the present invention involves "profiling" of passengers, shippers, origins, senders, freight forwarders etc. Such profiling will be considered as discrimination by some, but discrimination is exactly what is required in order to speed up in-transit screening process. There are several types of high-risk passengers, which are difficult to identify, and profiling procedures are therefore performed in a computer data base. By reserving stringent inspection for the object sent by high-risk sender (e.g. passengers, in connection with intelligence warnings from outside sources), the vast bulk of peaceful passengers can be processed much more quickly. Although much of the system comprises software modules, the reliability of the system is high, because it is arranged to fail safe, i.e. any breakdown of the computer and software system leading automatically to the default mode wherein all cargo is routed to a stringent inspection path.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

DETAILED DESCRIPTION OF THE INVENTION

Figure 1:
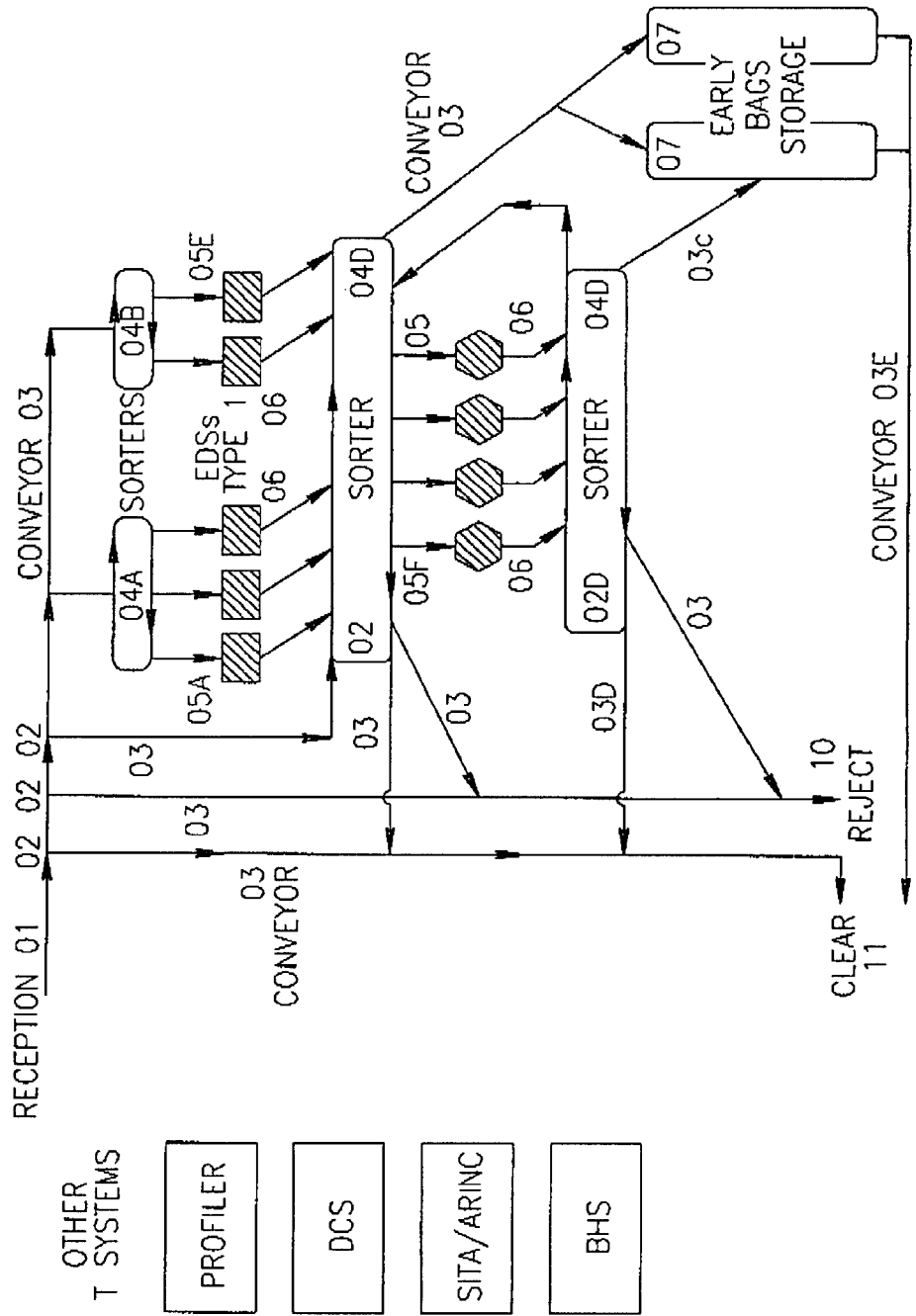
FIG. 1 is a schematic plan view of physical layout of the system.
Figure 2:
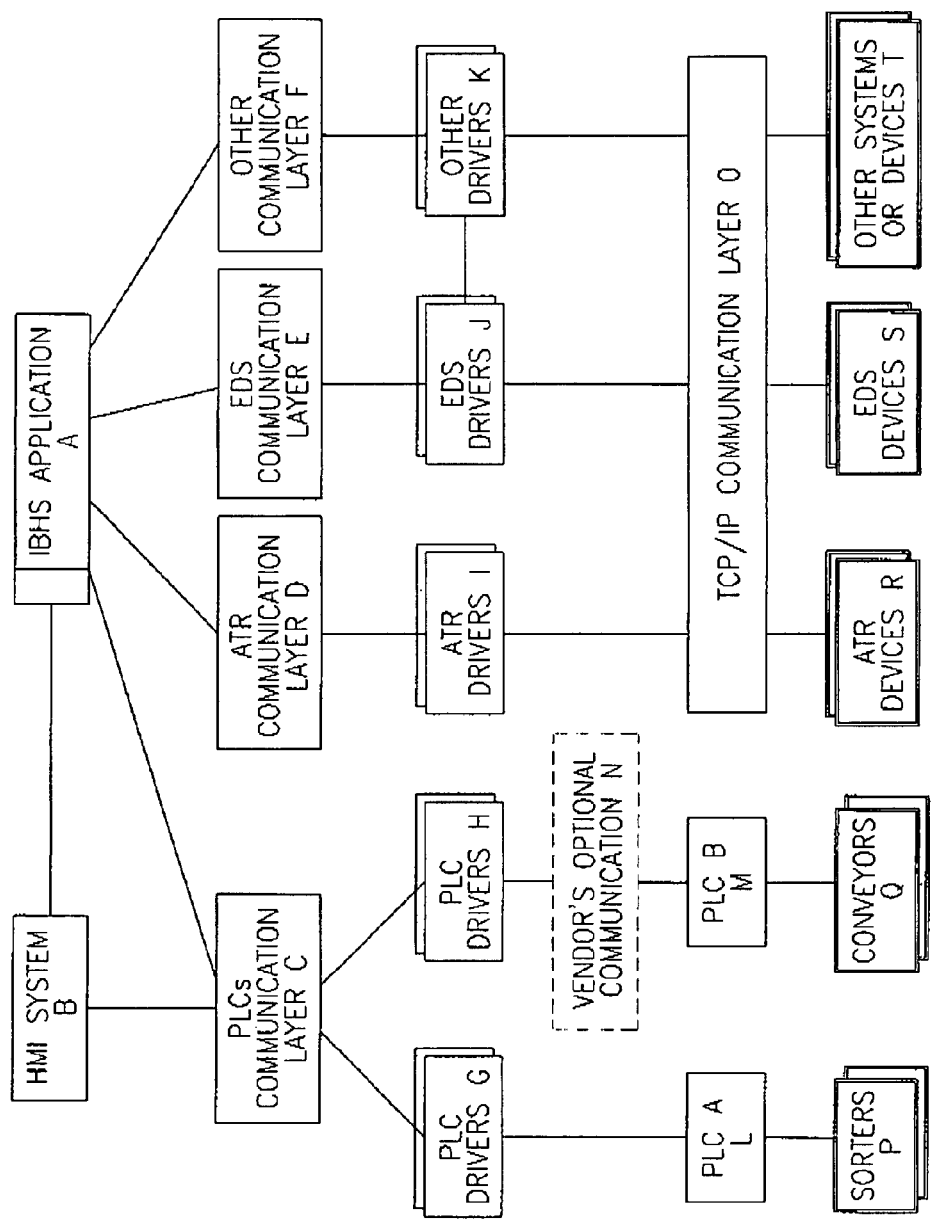
FIG. 2 is a block diagram of a preferred embodiment of the system according to the invention.

There is seen schematically in FIGS. 1 and 2 an automated security inspection and scurrying system for objects or packages. Typically such cargo comprises baggage, for example baggage belonging to passengers at the outgoing terminal of an airport.

Numeric references relate to FIG. 1, Alpha references relate to FIG. 2

Object Identification

When an object is received into the system, at the reception point (01) an internal and unique ID is assigned by the application (A) in order to identify the object throughout the entire system.

The object itself may have other "external" ID's determined by other external systems for various purposes (Bar Code number, 10 digit barcode number etc.).

If those external systems are available, IBHS (Baggage Handling System) may acquire the "external" ID in many ways:

Via ATR (Automatic Tag Reader) using Bar Code tag, RFID tag etc. located at the reception point (01) and/or via dedicated interfaces (T) with external information systems and databases. Due to its generic nature and design, the IBHS interconnects with any ATR machine via an ATR layer (D) and drivers (I) which is a special and unique software module.

The interface (T) and interconnection with any external system, mainly BHS-baggage handling systems, DCS-departure control systems, IATA (International Air Transport Association) compliant systems (SITA-Societe International de Telecommunications Aeronautics, ARINC etc.) is performed via communication layer (O) which is a special and unique software module, utilizing TCP/IP techniques.

In order to demonstrate one of the optional mode of operation, assume that object Z was identified by the application (A) as object 1357.

Risk Level Assignment

Whenever a new object is identified, the IBHS retrieves and assigns a security status for the object, namely Risk Level.

The IBHS may acquire the Risk Level in many ways:

Via ATR (Automatic Tag Reader) using Bar Code tag, RFID tag etc. located at the reception point (01) and/or via dedicated interfaces (T) with external information systems and databases.

Due to its generic nature and design, the IBHS interconnects with any ATR machine via an ATR layer (D) and drivers (I) which is a special and unique software module.

The interface (T) and interconnection with any external system mainly profiling systems (e.g. CAPPS), BHS-baggage handling systems, DCS-departure control systems, IATA compliant systems (SITA, ARINC etc.) is performed via communication layer (O) which is a special and unique software module, utilizing TCP/IP techniques.

If required, the Risk Level is converted by the application (A) and normalized to the local site using special pre-defined conversion tables.

In order to continue the demonstration of the relevant mode of operation, assume that object Z (ID=1357) received the risk level S3 (medium risk).

Screening Process Sequence Determination

Whenever an object is received, identified and assigned with a security status (Risk Level), the IBHS (A) activates unique optimization algorithms to achieve the following goals:

Perform the best screening process adequate for the risk level in order to verify the security clearance of the given object. This security oriented feature is supported by predefined security policy and rules, established by the security staff using a unique software mechanism in the application (A).

Perform an efficient process considering load analysis in order to support the material handling throughputs required, and reduce bottle-necks even when peak time.

This material handling oriented feature is managed by several unique software mechanisms:
- An automated mechanism to calculate and detect overload of the entire system or some of its components (diverters (02), conveyors (03), sorters (04) etc.) supported by a PLC (Programmable Logic Controller) communication layer (C) which is a special and unique software module. One of the outcomes of such calculation may route the object to one of the rightmost sorters (04b).
- An automated mechanism to detect failure of some of the components (02, 03, 04, 05, 07), supported by a PLC communication layer (C) which is a special and unique software module.
- An automated mechanism, supported by interfaces (T) with external systems (e.g. check-in systems for passenger baggage, departure scheduling table of planes, ships, trucks etc.) to predict expected load, using a communication layer (O) which is a special and unique software module, utilizing TCP/IP techniques.
- An automated mechanism within the application (A) to detect under capacity of the entire system, to increase level of security by routing relevant objects to a higher level screening process than usually required.
- A manual mechanism to record the user definition of the load level he wishes to work upon.

The outcome of the algorithms is a well-defined screening sequence consisting of:
- The types of the explosive detection systems (05) to be used, The pre-settings required,
- The next steps required when alarms are detected (regarding the alarm type),
- The actual conveying route,
- The actual screening machine (out of several machines per type)
- The final destination (clear (11), reject (10).

In order to continue the demonstration of the relevant mode of operation, assume that object Z (ID=1357, risk level=S3) is routed to sorter 04b, and is assigned to be screened using EDS (Explosive Detection System) type 1, machine 05e.

Object direction and tracking throughout the system

The IBHS directs and tracks the flow and the location of the object from the minute it was received (01) until it is released as "cleared" (11) or "reject" (10).

This monitoring feature is performed via the PLC communication layer (C) which is a special and unique software module.

The PLC communication layer interconnects all PLC's (L,M), using the relevant drivers required (G,H), either directly or via vendor's communication environments (N).

Both tracking and monitoring functionality are based on many sensors which are located almost at any point of the system: sensors, photo cells, detectors etc.

This discrete process is fully automated with extensive data exchange with the central application (A).

In order to support the operative staff of material handling, a HMI-Human Machine Interface (B) is connected to all relevant material handling components as well as screening devices, thus reflecting graphically the flow of the objects, failure of components/devices and more.

In order to continue the demonstration of the relevant mode of operation, assume that object Z (ID=1357, risk level=S3, sorter 04b, EDS type1 05e) is moving from reception point 01, crossing several diverters 02, and is conveyed 03 to sorter 04a where it is diverted to EDS 05e for security screening.

Explosive Detection Machines Pre-Setting

According to the Risk Level of the object, its required screening process, previous screening results (if any) within the IBHS and some other parameters, the IBHS interconnects with the specific explosive detection machine (05) (out of several machines of the same type) to dynamically pre-set the configuration of the machine before the screening.

Machine configuration consists of many parameters including screening technique, screening intensity, decision tree for optional screening results, the need for human intervention (using image on a workstation), the location of a suspected item within the object (previously detected by another machine) and more.

This feature is supported by interfaces (J) with explosive detection systems communication layer (O) which is a special and unique software, module, utilizing a set of drivers and TCP/IP techniques.

In order to continue the demonstration of the relevant mode of operation, assume that object Z (ID=1357, risk level=S3, sorter 04b, EDS type 1 05e) at the gate of EDS 05e, and the system instructs the machine to perform the screening according to settings T1S3 configuration (appropriate for the S3 risk level).

Screening Results Analysis

The IBHS interconnects (E,J,O,S) with the relevant explosive detection machine (05) in order to receive the screening results as the input for further decision about the object screened.

The result will contain the security indication detected by the machine ("alarm", "clear", "dark alarm" etc.) and other relevant parameters available by the machine (different machines and technology provide different set of parameters): the location of a suspected item within the object, the mass and atomic number of a material detected, the digital image of the object etc.

This security oriented feature is supported by interfaces with explosive detection systems communication layer (E) which is a special and unique software module, utilizing a set of drivers (J) and TCP/EP techniques (O).

In order to continue the demonstration of the relevant mode of operation, assume that object Z (ID=1357, risk level=S3, sorter 04b, EDS type 1 05e) is out of EDS 05e, and the system retrieves the result of "dark alarm" from the machine. Meanwhile, the object is moving out from the machine 06 into sorter 04c.

Object Routing Subject to Screening Results

According to the Risk Level of the object, its required screening process and the previous screening results received (see "Screening results analysis"), the application (A) determines the object's next destination.

There are several options: "clear" thus go to exit (11), "alarm" thus go to another screening process or even directly to the "reject" (10), "dark alarm" thus go to another screening process and more.

If another screening process is determined, the object will be routed to another class of machine with another pre-set configuration (see "Explosive detection machines Pre-setting").

In order to continue the demonstration of the relevant mode of operation, assume that object Z (ID=1357, risk level=S3, current sorter 04c, EDS type 1 result=Dark alarm) and the system determines it requires another screening on EDS type2. Due to load analysis, the object will be routed to EDS type2 machine 05f.

The relevant mode of operation may end when the results of 05f will indicate that no explosives were detected, thus the object will be routed using sorter 04d the relevant diverters 02d and conveyors 03d until it reaches the "clear" exit 11.

Sometimes, when the object is an "early bag", it will be routed using conveyor 3*c* to the early bag storage 07 where after a while it will be retrieved and conveyed 03*e* to the "clear" exit 11.

The physical side of the system, seen in FIG. 1, includes a plurality of various cargo security screening machines in combination with conveying and sorting devices 04. Each package is tracked by sensors located at various points from a object reception point 01 via the screening devices or machines to reach a cargo sorting junction, via a user-adjustable screening process which resides in the computer software.

The conveying and sorting components are interfaced, usually by programmable logic controllers (PLC), with the security status data for assigning a risk assessment factor to cargo of the sender.

The output of the first screening devices through which the package has passed is processed immediately, and the risk assessment factor is adjusted by the computer software accordingly. The updated destination according to the updated factor is sent to a control system, seen in FIG. 2 as the PLC control layer, of the conveying and sorting components, whereby the cargo package is accordingly diverted to a track leading to a suspicious cargo bay, or to a track to a bay for further screening of doubtful cargo, or to the cleared cargo track after acceptance for transportation. Cargo which is cleared but cannot be accepted immediately for loading and transportation is diverted to an automated storage facility.

Figure 3:
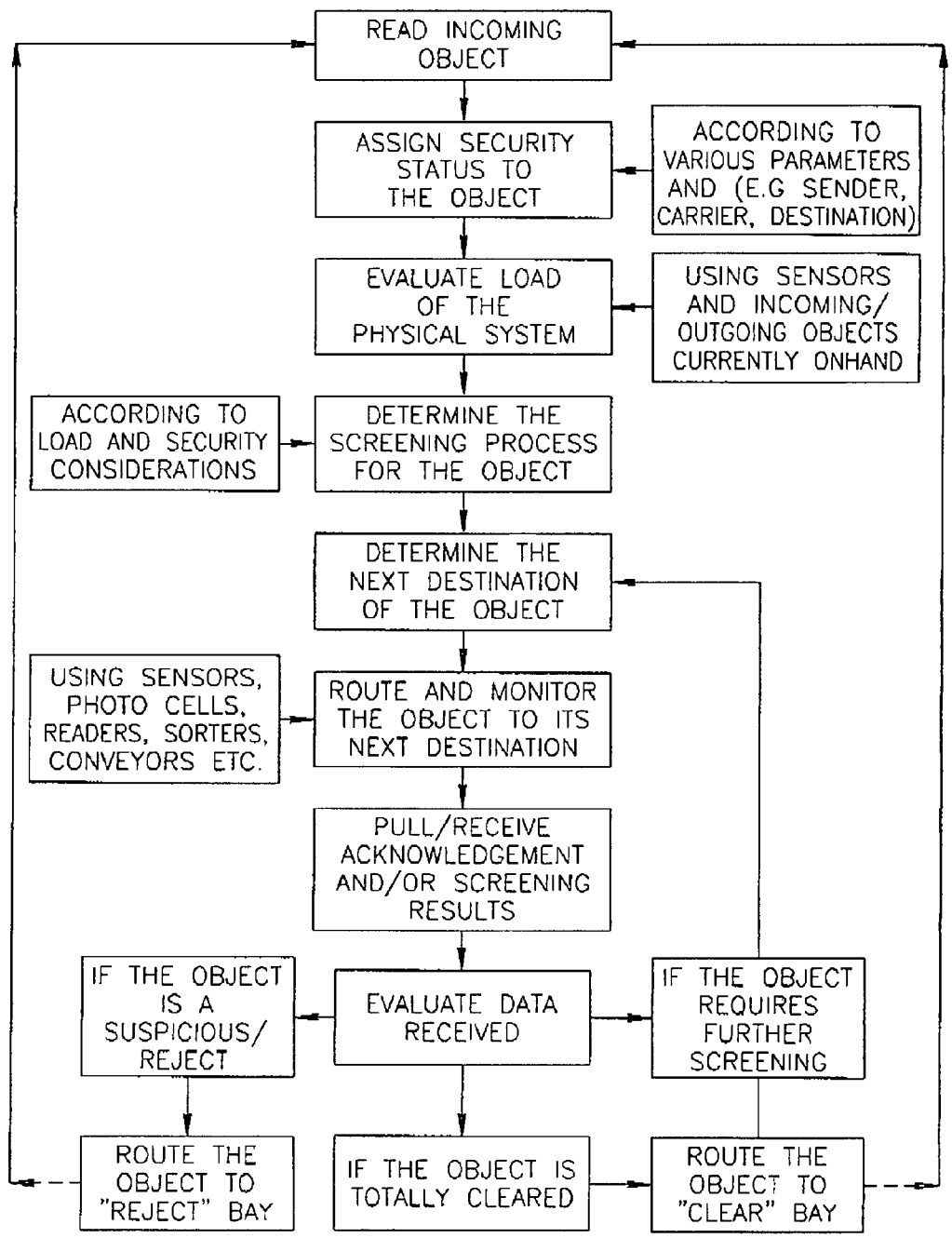
FIG. 3 is a block diagram of the main internal activities.

FIG. 3 Is a block diagram relating to the main internal activities of the system.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

We claim:

1. A method comprising:
   selecting a risk level from a plurality of risk levels for a security inspection of an object of a plurality of objects;
   identifying a load level of an inspection unit from a plurality of load levels of said inspection unit;
   generating an inspection process for said object, said process generated considers said risk level of said object and said load level of said inspection unit;
   dynamically setting a configuration of said inspection unit based upon the risk level of said object; and
   adjusting a degree of inspection of said inspection unit based upon an anticipated loading requirements of said inspection unit.

2. The method as in claim 1, comprising predicting a load level for said inspection unit.

3. The method as in claim 1, comprising selecting a parameter for a screening machine, said parameter selected from the group consisting of a screening quality, a screening intensity, a screening sensitivity and throughput of said screening machine.

4. The method as in claim 1, wherein said generating comprises generating an inspection process for a baggage inspection system, said baggage inspection system comprising a manual inspection station and an automated inspection station.

5. The method as in claim 1, wherein said generating said inspection process comprises generating a first inspection process, and comprising generating a second inspection process for said object based on a result of an inspection by said inspection unit.

\* \* \* \* \*